US012434364B2

(12) United States Patent
Pomeroy et al.

(10) Patent No.: US 12,434,364 B2
(45) Date of Patent: Oct. 7, 2025

(54) CYLINDER ASSEMBLY FOR GAS SPRING FASTENER DRIVER

(71) Applicant: Techtronic Power Tools Technology Limited, Tortola (VG)

(72) Inventors: Edward Pomeroy, Piedmont, SC (US); Zachary Scott, Easley, SC (US); John Schnell, Anderson, SC (US); Essan Namouz, Greenville, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 230 days.

(21) Appl. No.: 18/318,083

(22) Filed: May 16, 2023

(65) Prior Publication Data

US 2023/0286123 A1 Sep. 14, 2023

Related U.S. Application Data

(63) Continuation of application No. 16/824,131, filed on Mar. 19, 2020, now Pat. No. 11,679,478, which is a continuation of application No. 15/807,727, filed on Nov. 9, 2017, now Pat. No. 10,632,600.

(60) Provisional application No. 62/419,801, filed on Nov. 9, 2016.

(51) Int. Cl.
*B25C 1/04* (2006.01)
*B25C 1/00* (2006.01)
*B25C 1/06* (2006.01)

(52) U.S. Cl.
CPC ................ *B25C 1/008* (2013.01); *B25C 1/04* (2013.01); *B25C 1/047* (2013.01); *B25C 1/06* (2013.01)

(58) Field of Classification Search
CPC .... B25C 1/00; B25C 1/03; B25C 1/04; B25C 1/047; B25C 1/06; B25C 1/08; B25C 1/008; B23P 11/005
USPC .......... 227/8, 10, 130, 120; 123/46 SC, 46 R
See application file for complete search history.

(56) References Cited

U.S. PATENT DOCUMENTS

| | | | |
|---|---|---|---|
| 5,720,423 | A | 2/1998 | Kondo et al. |
| 6,123,241 | A | 9/2000 | Walter et al. |
| 6,422,447 | B1 | 7/2002 | White et al. |
| 6,431,430 | B1 | 8/2002 | Jalbert et al. |
| 6,488,195 | B2 | 12/2002 | White et al. |
| 6,499,643 | B1 | 12/2002 | Hewitt |
| 6,547,503 | B1 | 4/2003 | Bohm et al. |

(Continued)

FOREIGN PATENT DOCUMENTS

| | | | |
|---|---|---|---|
| CA | 2607203 | A1 | 10/2007 |
| CN | 1190919 | A | 8/1998 |

(Continued)

OTHER PUBLICATIONS

European Patent Office Search Report for Application No. 17200925.0 dated Oct. 9, 2018, 16 pages.

(Continued)

*Primary Examiner* — Scott A Smith
(74) *Attorney, Agent, or Firm* — Michael Best & Friedrich LLP

(57) ABSTRACT

A method of manufacturing a pressure vessel includes forming an outer cylinder including an annular wall, positioning an inner cylinder within the outer cylinder, and deforming the annular wall of the outer cylinder to engage a portion of the inner cylinder to retain the inner cylinder within the outer cylinder and form the pressure vessel.

19 Claims, 13 Drawing Sheets

(56) References Cited

U.S. PATENT DOCUMENTS

| | | | | |
|---|---|---|---|---|
| 6,604,664 | B2 | 8/2003 | Robinson | |
| 6,659,127 | B2 | 12/2003 | Keast | |
| 6,672,498 | B2 | 1/2004 | White et al. | |
| 6,722,550 | B1 | 4/2004 | Ricordi et al. | |
| 6,966,478 | B2 | 11/2005 | Adams et al. | |
| 7,225,959 | B2 | 6/2007 | Patton et al. | |
| 7,494,035 | B2 | 2/2009 | Weaver et al. | |
| 8,079,504 | B1 | 12/2011 | Pedicini et al. | |
| 8,317,069 | B2 | 11/2012 | Zhang et al. | |
| 8,479,963 | B2 | 7/2013 | Kitagawa et al. | |
| 9,109,711 | B2 | 8/2015 | Mattson et al. | |
| 9,221,162 | B2 | 12/2015 | Kitagawa et al. | |
| 10,632,600 | B2 | 4/2020 | Pomeroy et al. | |
| 11,345,008 | B2 | 5/2022 | Pomeroy et al. | |
| 11,679,478 | B2 * | 6/2023 | Pomeroy | B25C 1/008 227/8 |
| 2002/0043547 | A1 | 4/2002 | Shkolnikov et al. | |
| 2002/0158102 | A1 | 10/2002 | Patton et al. | |
| 2003/0173393 | A1 | 9/2003 | Kral | |
| 2004/0206798 | A1 | 10/2004 | Robinson | |
| 2007/0029475 | A1 * | 2/2007 | Hausmann | B05B 11/1001 250/288 |
| 2007/0090205 | A1 * | 4/2007 | Kunze | B05B 11/0054 239/338 |
| 2009/0084823 | A1 | 4/2009 | Tanji et al. | |
| 2012/0090153 | A1 | 4/2012 | Spreitzer et al. | |
| 2013/0082085 | A1 | 4/2013 | Largo | |
| 2013/0270319 | A1 | 10/2013 | Gauger et al. | |
| 2015/0158160 | A1 | 6/2015 | Kato | |
| 2015/0202755 | A1 | 7/2015 | Tanji | |
| 2015/0352702 | A1 | 12/2015 | Chien | |
| 2016/0144497 | A1 | 5/2016 | Boehm et al. | |
| 2016/0229043 | A1 | 8/2016 | Wyler et al. | |
| 2017/0167962 | A1 | 6/2017 | Moore et al. | |
| 2018/0036870 | A1 | 2/2018 | Komazaki et al. | |
| 2018/0126527 | A1 | 5/2018 | Pomeroy et al. | |
| 2018/0126528 | A1 | 5/2018 | Pomeroy et al. | |
| 2018/0126530 | A1 | 5/2018 | Pomeroy et al. | |
| 2018/0290279 | A1 | 10/2018 | Kobori et al. | |

FOREIGN PATENT DOCUMENTS

| | | | |
|---|---|---|---|
| CN | 1532027 | A | 9/2004 |
| CN | 101712148 | A | 5/2010 |
| CN | 203532939 | U | 4/2014 |
| CN | 105339137 | A | 2/2016 |
| CN | 105818099 | A | 8/2016 |
| EP | 2243600 | A2 | 10/2010 |
| EP | 1893344 | B1 | 8/2013 |
| GB | 2101277 | A1 | 1/1983 |
| TW | 409787 | U | 10/2000 |
| TW | 435316 | U | 5/2001 |
| WO | 9943571 | A1 | 9/1999 |
| WO | 2006136427 | A1 | 12/2006 |
| WO | 2007116239 | A1 | 10/2007 |
| WO | 2016174994 | A1 | 11/2016 |

OTHER PUBLICATIONS

Extended European Search Report for Application No. 21204276.6 dated Jan. 20, 2022 (10 pages).

Chinese Patent Office Action for Application No. 201711108510.0 dated Mar. 15, 2022 (10 pages including statement of relevance).

* cited by examiner

CYLINDER ASSEMBLY FOR GAS SPRING FASTENER DRIVER

CROSS-REFERENCE TO RELATED APPLICATIONS

This application a continuation of U.S. patent application Ser. No. 16/824,131, now U.S. Pat. No. 11,679,478, filed on Mar. 19, 2020, which is a continuation of U.S. patent application Ser. No. 15/807,727, now U.S. Pat. No. 10,632,600, filed on Nov. 9, 2017, which claims priority to U.S. Provisional Patent Application No. 62/419,801 filed on Nov. 9, 2016, the entire contents of all of which are incorporated herein by reference.

FIELD OF THE INVENTION

The present invention relates to powered fastener drivers, and more particularly to gas spring-powered fastener drivers.

BACKGROUND OF THE INVENTION

There are various fastener drivers used to drive fasteners (e.g., nails, tacks, staples, etc.) into a workpiece known in the art. These fastener drivers operate utilizing various means (e.g., compressed air generated by an air compressor, electrical energy, flywheel mechanisms) known in the art, but often these designs are met with power, size, and cost constraints.

SUMMARY OF THE INVENTION

The present invention provides, in one aspect, a method of manufacturing a pressure vessel. The method includes forming an outer cylinder including an annular wall, positioning an inner cylinder within the outer cylinder, and deforming the annular wall of the outer cylinder to engage a portion of the inner cylinder to retain the inner cylinder within the outer cylinder and form the pressure vessel.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
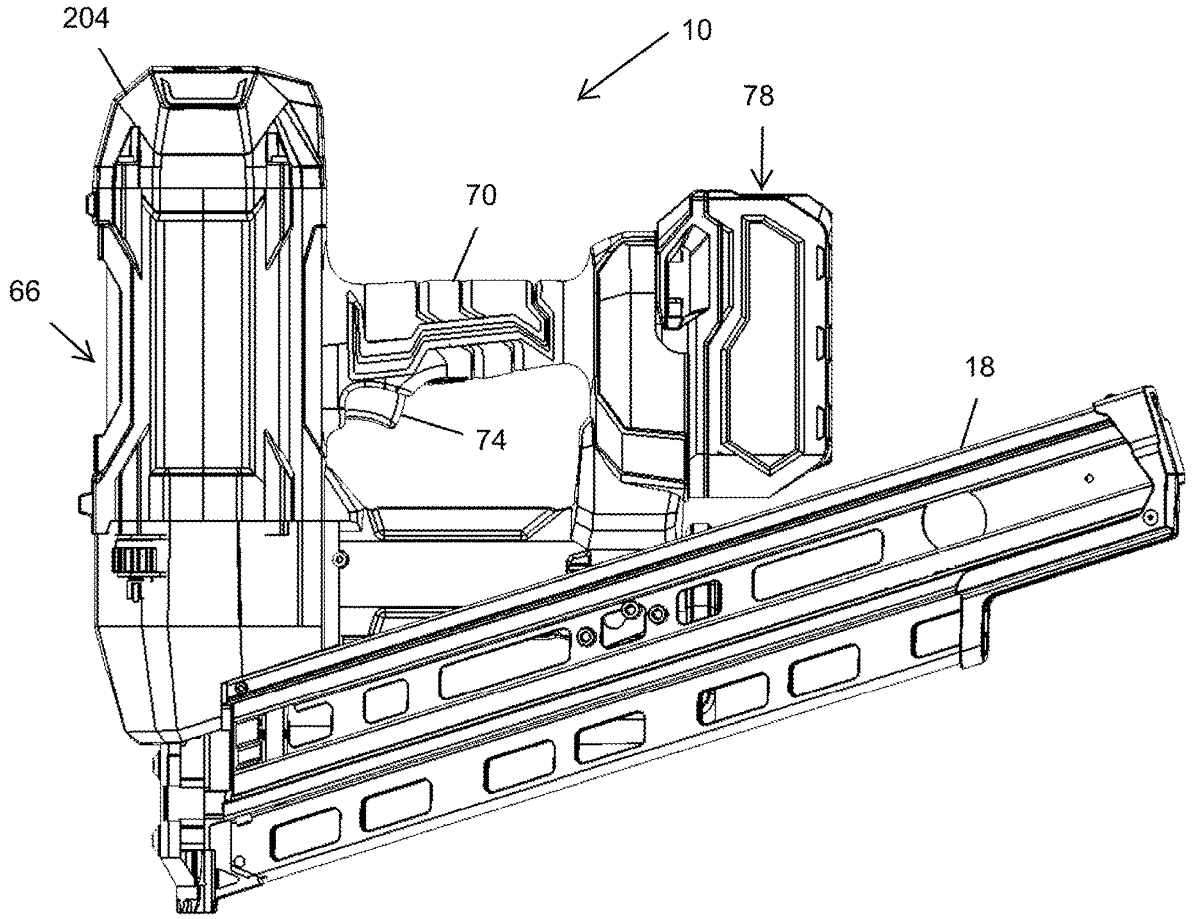
FIG. 1A is a side view of a gas spring-powered fastener driver in accordance with an embodiment of the invention.
Figure 1B:
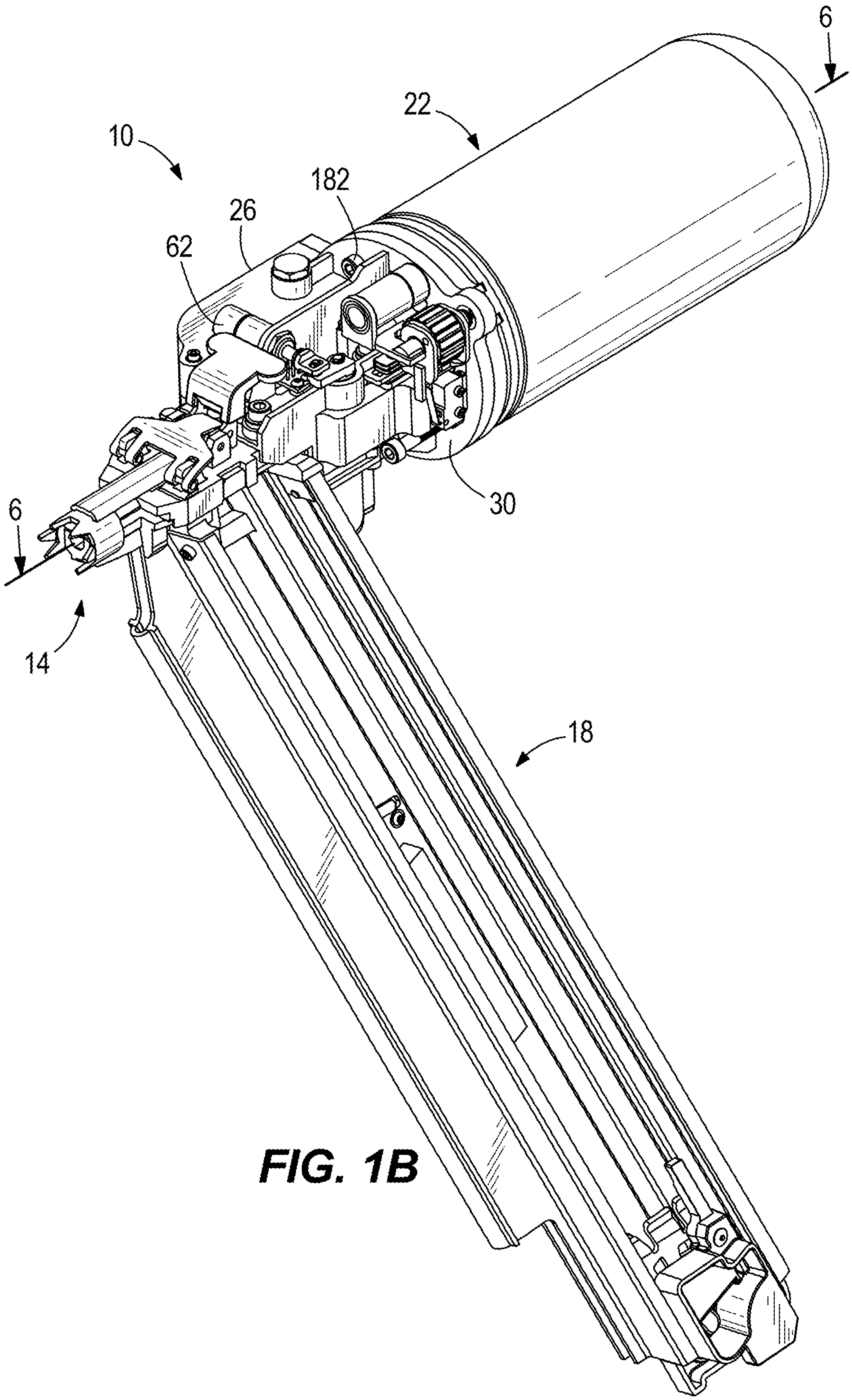
FIG. 1B is a right perspective view of the gas spring-powered fastener driver of FIG. 1A, with portions removed.
Figure 2:
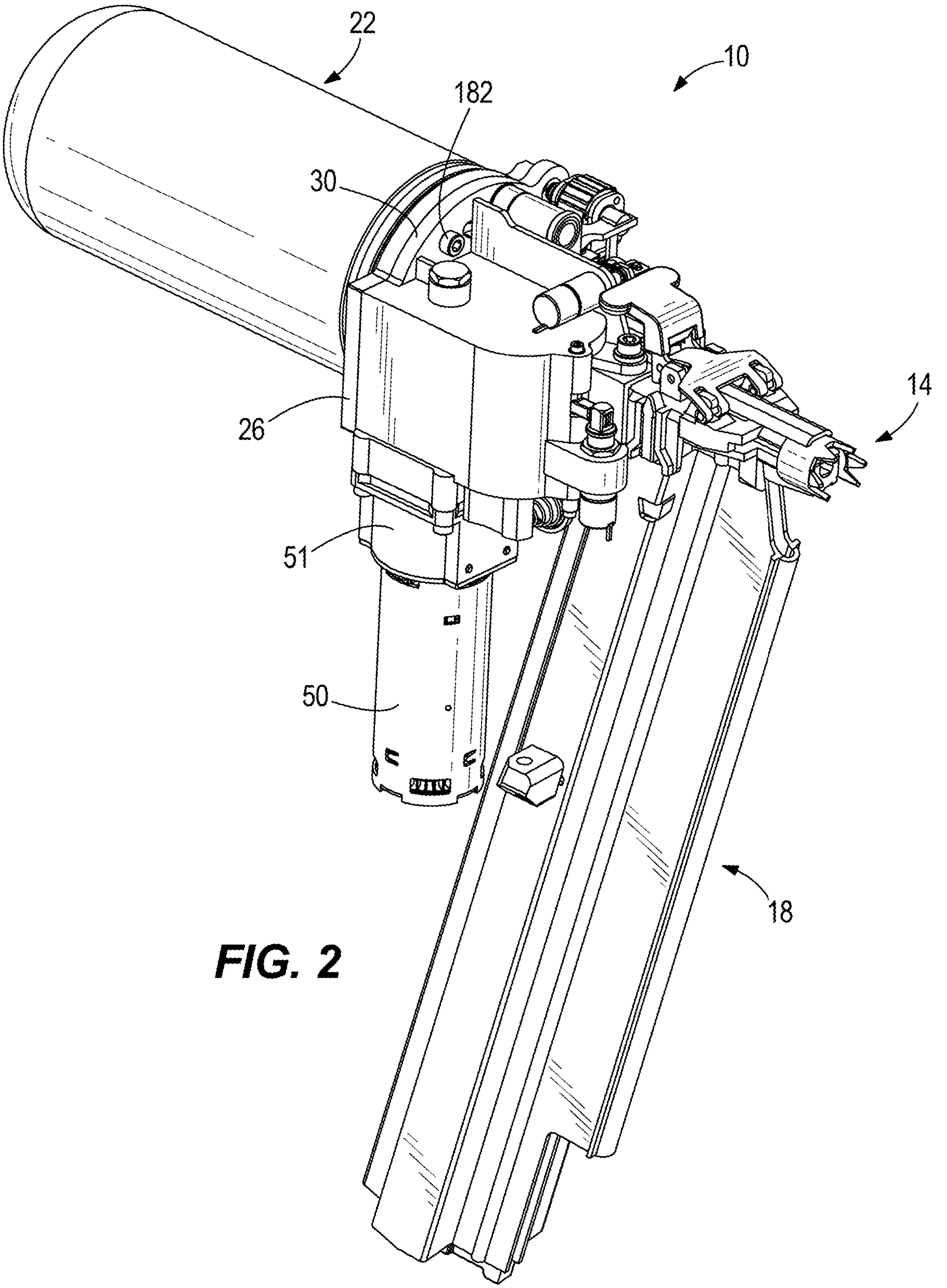
FIG. 2 is left perspective view of the gas spring-powered fastener driver of FIG. 1B.
Figure 3:
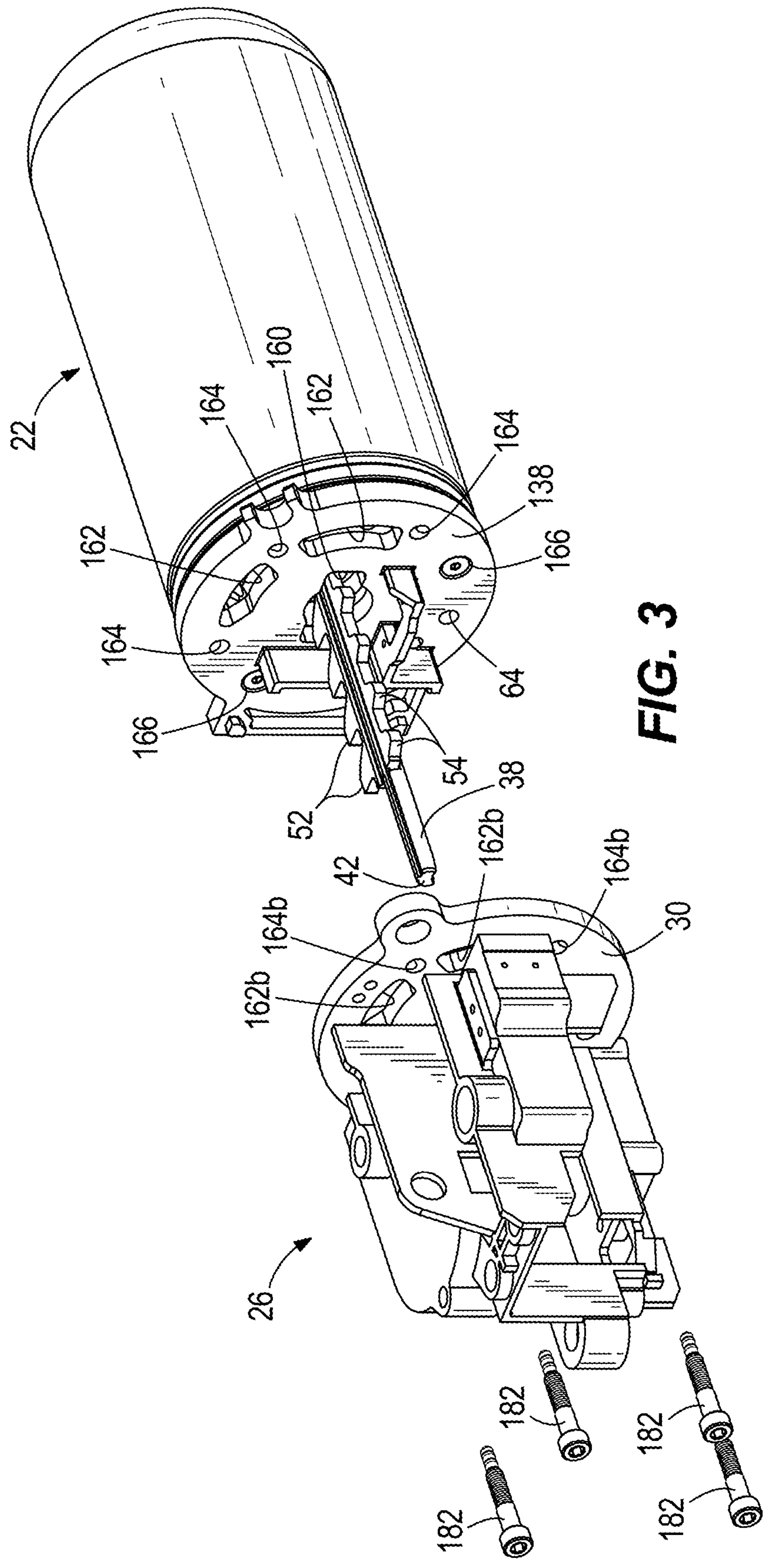
FIG. 3 is an exploded bottom view of a gas cylinder assembly disconnected from an internal housing frame of the gas spring-powered fastener driver of FIG. 1A.
Figure 4:
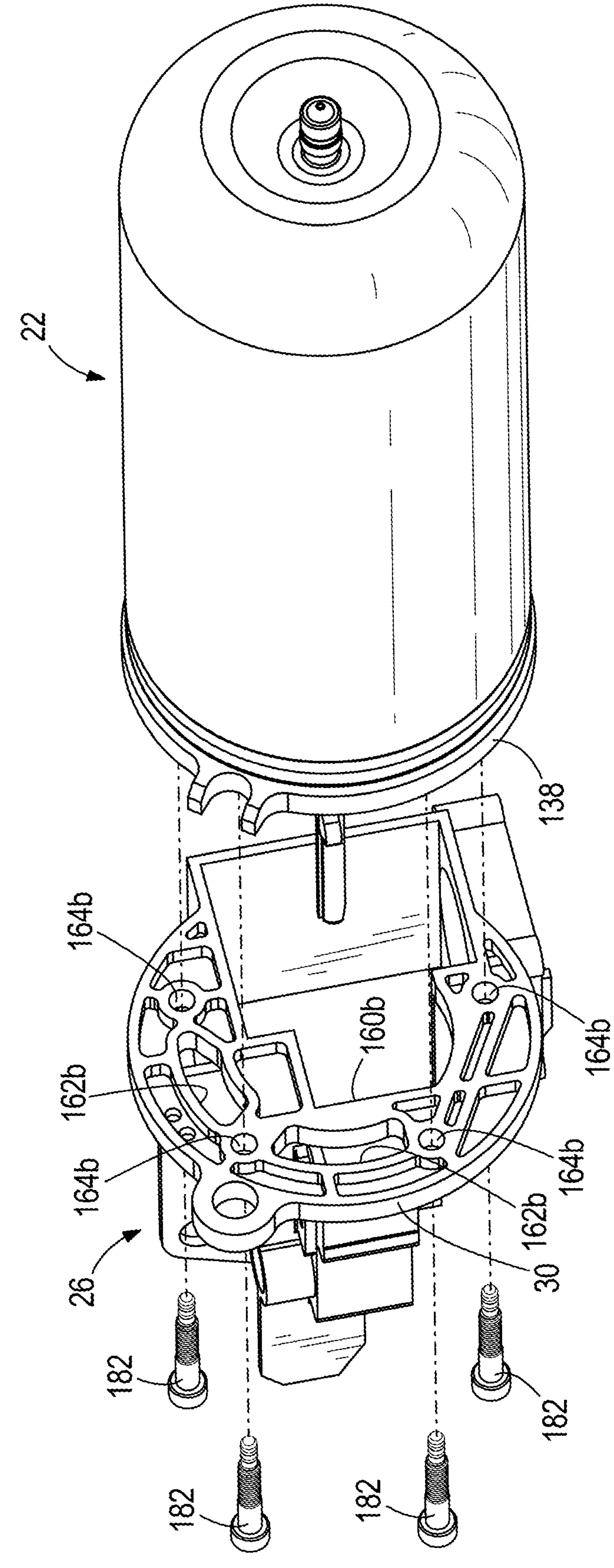
FIG. 4 is an exploded top view of the gas cylinder assembly and the internal housing frame of FIG. 3.
Figure 5:
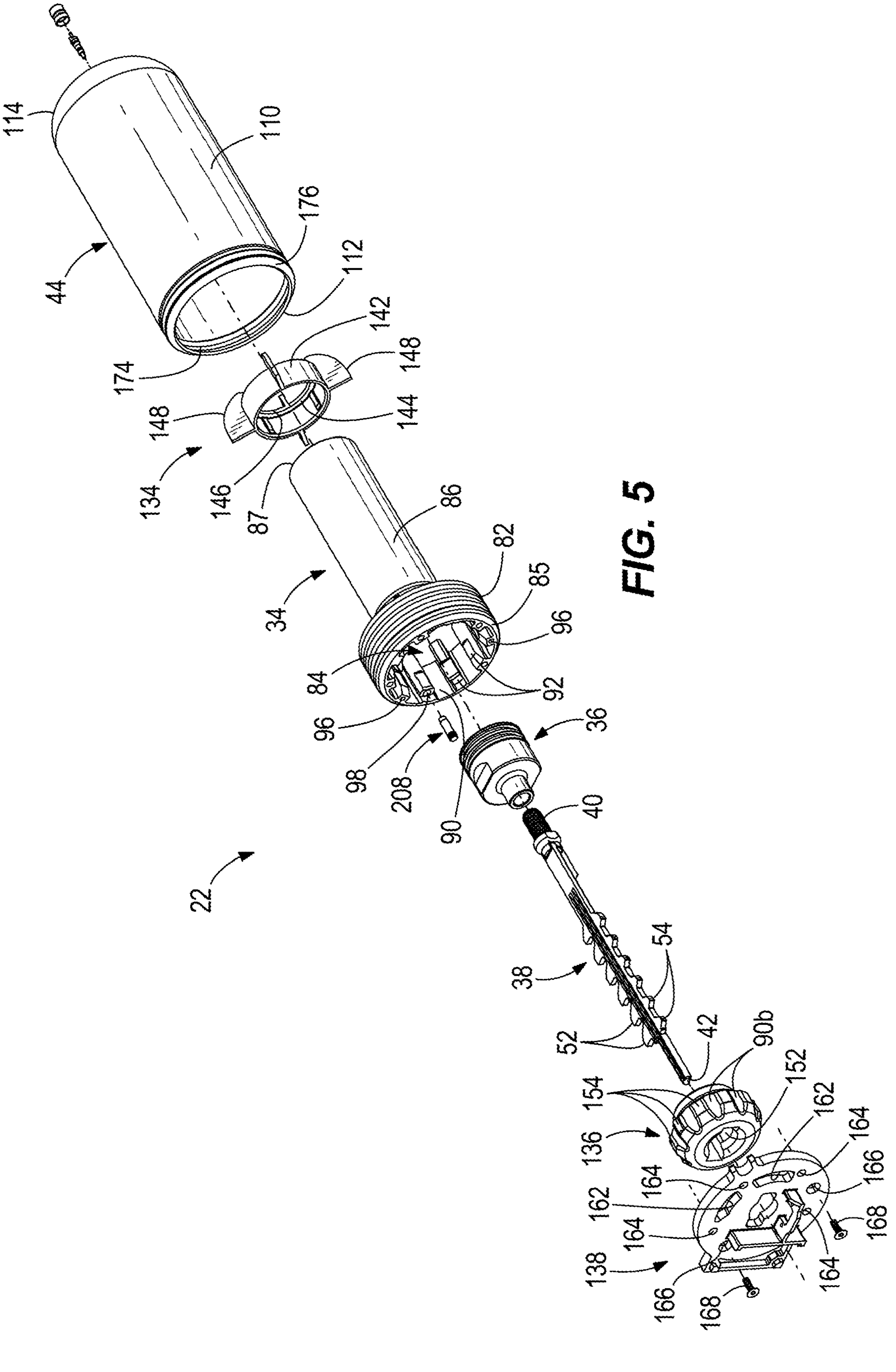
FIG. 5 is an exploded view of the gas cylinder assembly of FIG. 3.
Figure 6:
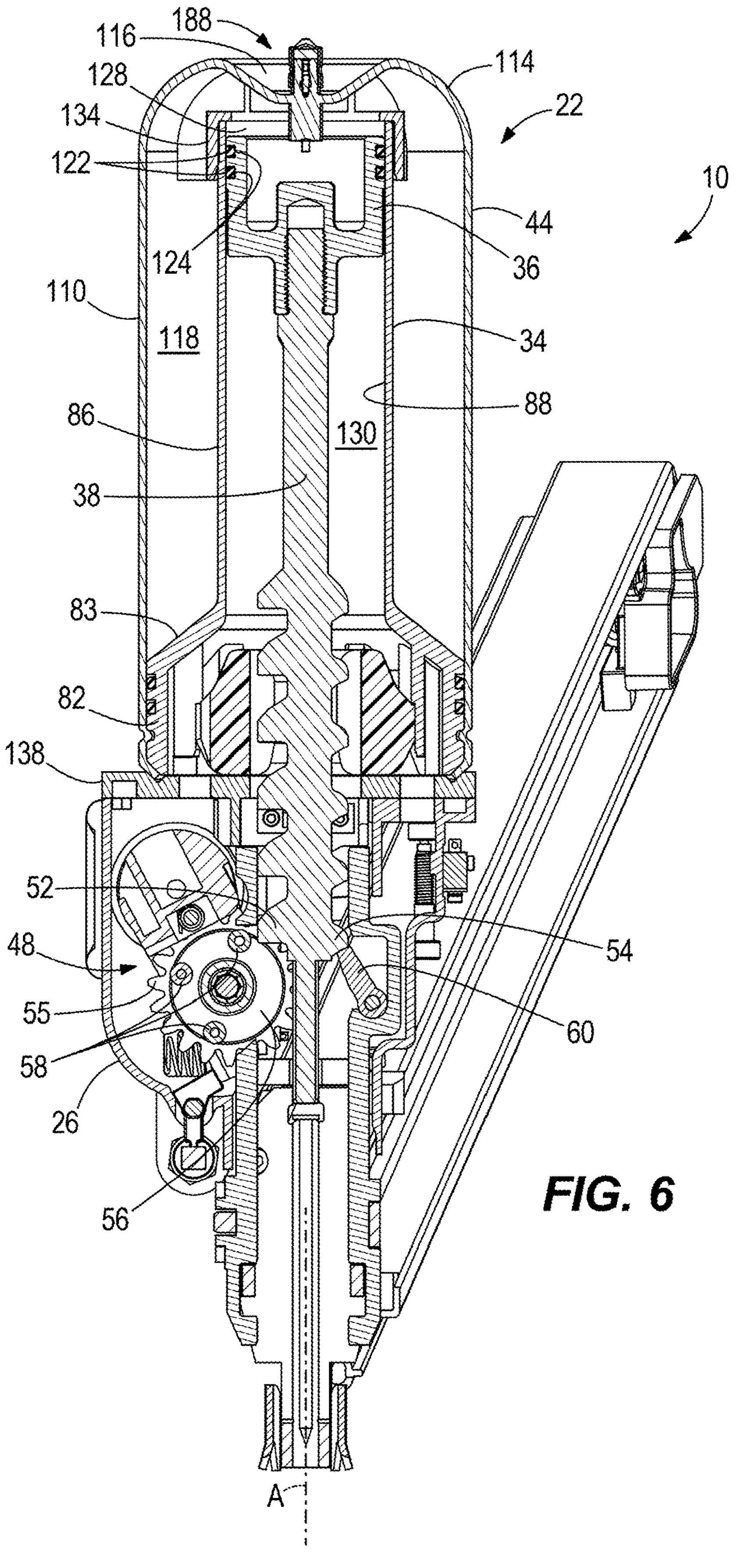
FIG. 6 is a cross-section view of the gas spring-powered fastener driver of FIG. 1A, illustrating a driver blade and a piston of the gas cylinder assembly in a retracted position, just prior to initiation of a fastener, taken along lines 6-6 shown in FIG. 1B.
Figure 7:
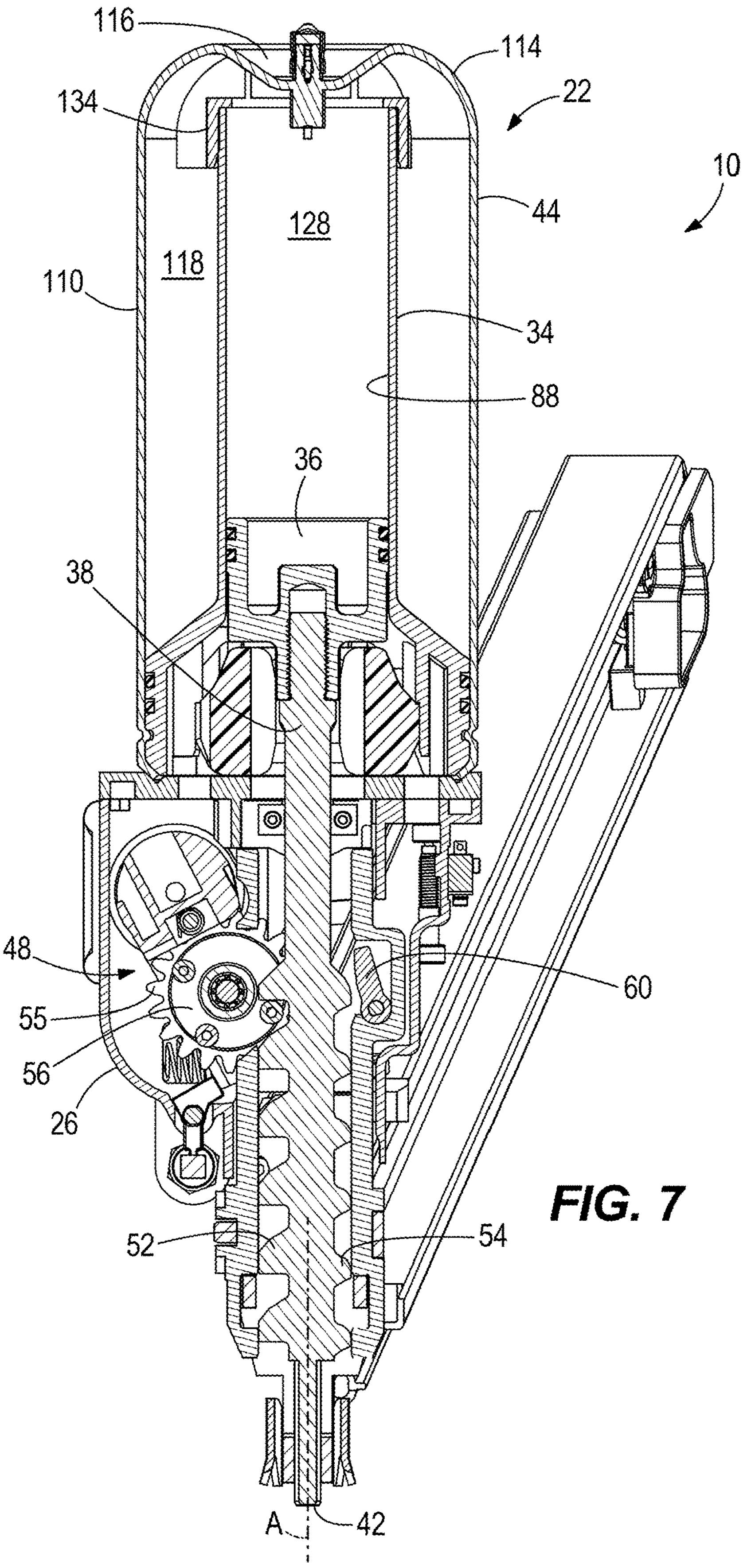
FIG. 7 is a cross-section view of the gas spring-powered fastener driver of FIG. 1A, illustrating the driver blade and the piston of the gas cylinder assembly in a driven position just after initiation of the fastener firing operation, taken along lines 6-6 shown in FIG. 1B.

FIGS. 1A-2 illustrate a gas spring-powered fastener driver 10 operable to drive fasteners (e.g., nails, tacks, staples, etc.) into a workpiece. The fastener driver 10 includes a nosepiece 14, and a magazine 18 for sequentially feeding fasteners (e.g., collated fasteners) into the nosepiece 14 prior to each fastener-driving operation. The fastener driver 10 further includes a gas cylinder assembly 22 removably coupled to a mounting plate 30 of an internal frame structure 26 (i.e., housing), as shown in FIGS. 3-4. With reference to FIGS. 5-7, the gas cylinder assembly 22 includes an inner piston cylinder 34 and a moveable piston 36 positioned within the inner cylinder 34. The fastener driver 10 further includes a driver blade 38 that is attached to the piston 36 via a threaded end 40 (FIG. 5) and moveable therewith. The driver blade 38 extends through the internal frame structure 26 such that a tip 42 of the driver blade 38 is received within the nosepiece 14. The fastener driver 10 does not require an external source of air pressure, but rather the gas cylinder assembly 22 further includes an outer cylinder 44 containing pressurized gas (e.g., air) in fluid communication with the inner cylinder 34. In the illustrated embodiment, the inner cylinder 34 is positioned concentrically within the outer cylinder 44.

With continued reference to FIGS. 5-7, the inner cylinder 34 and the driver blade 38 define a driving axis A (FIG. 6), and during a driving cycle the driver blade 38 and piston 36 are moveable between a retracted or ready position (see FIG. 6) and a driven position (i.e., bottom dead center; see FIG. 7). The fastener driver 10 further includes a lifting assembly 48, which is driven by a motor 50 (FIG. 2) via a transmission 51 (FIG. 2), and which is operable to move the driver blade 38 from the driven position to the ready position. The lifting assembly 48 is generally enclosed in and supported by the internal frame structure 26.

The driver blade 38 includes a plurality of first teeth 52 positioned along one side of the driver blade 38 and a plurality of second teeth 54 positioned along an opposite side of the driver blade 38. The lifting assembly 48 further includes a pinion 55 drivingly coupled to a lifter 56 having three bearings 58 positioned circumferentially about the lifter 56. The bearings 58 are configured to engage the first teeth 52 as the lifter 56 rotates to move the driver blade 38 to the ready position (FIG. 6). A spring biased latch 60 is pivotably mounted to the internal frame structure 26 and is biased into engagement with the second teeth 54 as the driver blade 38 is moved to the ready position and while in the ready position to prevent movement of the driver blade 38 towards the driven position. The latch 60 is arranged to be operatively disengaged from the second teeth 54 by actuation of a solenoid 62 (FIG. 1B) to release the driver blade 38 and the piston 36, such that the piston 36 and the driver blade 38 are thrust downwards toward the driven position (FIG. 7) by the expanding gas within the gas cylinder assembly 22.

As shown in FIG. 1A, the fastener driver 10 may include an outer housing 66 having a cylinder support portion 68 in which the gas cylinder assembly 22 may be at least partially positioned, a handle portion 70 graspable by a user during normal operation, and a transmission housing portion 72 in which the transmission 51 is at least partially positioned. A trigger 74, which is depressible by the user of the fastener driver 10 to initiate a fastener driving operation, is adjacent the handle portion 70. In some embodiments, at least two selected from the group of the cylinder support portion 68, the handle portion 70, and the transmission housing portion 72 may be formed together as a generally singular piece (i.e., two halves formed using a casting or molding process, depending on the material used). In some embodiments, the housing 66 is formed from plastic.

With reference to FIG. 2, the motor 50 is coupled to the internal frame structure 26 and selectively provides torque to the transmission 51 to rotationally drive the lifter 56 of the lifting assembly 48 when activated. A battery 78 (FIG. 1A) is electrically connected to the motor 50 for supplying electrical power to the motor 50. The trigger 74 may be actuated to selectively provide power to the motor 50. The battery 78 is mechanically connectable to a battery receptacle 76 formed by the outer housing 66 at a distal end of the handle portion 70 of the housing 66. In the illustrated embodiment, the battery is a rechargeable battery. In alternate embodiments, the fastener driver 10 may be powered from an AC voltage input (i.e., from a wall outlet or mains), or by an alternative DC voltage input (e.g., a DC power supply).

With reference to FIGS. 5-7, the inner cylinder 34 has a first annular wall 82 defining a cavity 84, and a second annular wall 86 extending axially from the first annular wall 82 to an upper open end 87. A tapered wall 83 (FIG. 6) connects the first and second annular walls 82, 84. The second annular wall 86 defines a piston bore 88, which receives the piston 36. A plurality of bosses 92 (FIG. 5) extend radially into the cavity 84 from the first annular wall 82. The bosses 92 are evenly circumferentially spaced about the axis A, such that a channel 90 is defined between any two adjacent bosses 92. Four of the bosses 92 define mounting fastener bores 94 (FIG. 8), two of the bosses 92 define end cover fastener bores 96, one of the bosses 92 defines a valve bore 98 (FIG. 10), and one of the bosses 92 defines a safety rupture bore 100 (FIG. 11). An outer surface of the first annular wall 82 defines a pair of circumferentially extending seal grooves 102 (FIG. 8) that each receives a first gasket or annular seal 104. The outer surface of the first annular wall 82 also defines a circumferentially extending coupling groove 106 positioned axially between a lower end 85 of the inner cylinder 34 and the seal grooves 102. As explained in greater detail below, the groove 106 receives a projection 174 of the outer cylinder 44 to couple the inner cylinder 34 and the outer cylinder 44 together.

With continued reference to FIGS. 5-7, the outer cylinder 44 includes a third annular wall 110 defining a cavity with an inner diameter slightly larger than an outer diameter of the first annular wall 82 of the inner cylinder 34. The outer cylinder 44 has an upper end with a rear wall 114 to close off the cavity and an opposite open lower end 112. The rear wall 114 is generally semi-spherical with a central recessed portion 116. The outer cylinder 44 receives the inner cylinder 34 such that both the first and second annular walls 82, 86 of the inner cylinder 34 extend into the outer cylinder 44. In the illustrated embodiment, the lower end 85 of the inner cylinder 34 is adjacent the lower end 112 of the outer cylinder 44. The first gaskets 104 between the seal grooves 102 of the inner cylinder 34 and the inner surface of the outer cylinder 44 provide a gas-tight seal. A gas storage chamber 118 is defined between the inner cylinder 34 and the outer cylinder 44. The piston bore 88 is in fluid communication with the gas storage chamber 118 via the upper end 87 of the inner cylinder 34.

With continued reference to FIGS. 6-7, the piston 36 defines a pair of circumferentially extending grooves 122 that each receives a second gasket or piston ring 124 for sealing the piston 36 within the piston bore 88. Accordingly, the gas cylinder assembly 22 includes a high-pressure side 128 and a low-pressure side 130 that each inversely vary in volume as the piston 36 translates within the piston bore 88. The high-pressure side 128 includes a portion of the piston bore 88 above (i.e., toward the rear wall 114 of the outer cylinder 44) the piston 36 and the gas storage chamber 118. The low-pressure side 130 beneath (i.e., toward the lower end 112 of the outer cylinder 44) the piston 36. The low-pressure side 130 is in fluid communication with atmosphere, as described in more detail below.

With reference to FIG. 5, the gas cylinder assembly 22 further includes a cylinder spacing member 134, a bumper 136, and a cylinder end cover 138 (FIG. 3). The cylinder spacing member 134 includes an annular cap 142 that receives the upper end 87 of the second annular wall 86 of the inner cylinder 34. The annular cap 142 has a rim 144 defining an opening 146. The rim 144 supports the spacing member 134 on the upper end 87 of the second annular wall 86. The cylinder spacing member 134 further includes a plurality of fins 148 extending radially outward from the annular cap 142. In the illustrated embodiment, there are four fins 148. In other embodiments, there may be more or less than four fins 148. The fins 148 contact both the rear wall 114 and the third annular wall 110 of the outer cylinder 44 to hold the inner cylinder 34 axially in place and to radially center the inner cylinder 34 within the outer cylinder 44. The opening 146 in the spacing member 134 allows for fluid communication between the piston bore 88 and the gas storage chamber 118.

With continued reference to FIG. 5, the bumper 136 is positioned within the cavity 84 of the inner cylinder 34. The bumper 136 defines a central passage 152 to receive and guide the driver blade 38. The bumper 136 also includes radially extending projections 154 evenly circumferentially spaced about the axis A such that a channel 90*b* is defined between any two adjacent projections 154. Each of the projections 154 on the bumper 136 is supported on a corresponding one of the bosses 92 of the inner cylinder 34. Accordingly, the channels 90, **90*b* of the inner cylinder 34 and the bumper 136 form a plurality of passages extending from the low-pressure side 130 of the piston bore 88 around the bumper 136. The bumper 136 may be made of a material to inhibit wear caused by repeated impacts from the piston 36 and friction between the driver blade 38 and the central passage 152. For example, the bumper 136** may be made from a wear resistant plastic.

With reference to FIGS. 3 and 5, the cylinder end cover 138 defines a central aperture 160 through which the driver blade 38 extends. The end cover 138 further defines a plurality of arcuate slots 162 extending through the end cover 138 and in fluid communication with the low-pressure side 130 side via the passages formed between the bumper 136 and the inner cylinder 34. The end cover 138 further defines four mounting fastener apertures 164 and two end cover fastener apertures 166 corresponding to the mounting fastener bores 94 and the end cover fastener bores 96 of the inner cylinder 34, respectively. Each of corresponding end cover fastener apertures 166 and end cover fastener bores 96 receive an end cover fastener 168 to couple the end cover 138 to the inner cylinder 34. The end cover 138 retains the bumper 136 and the piston 36 within the inner cylinder 34, and the driver blade 38 from being disconnected from the piston 36.

Figure 8:
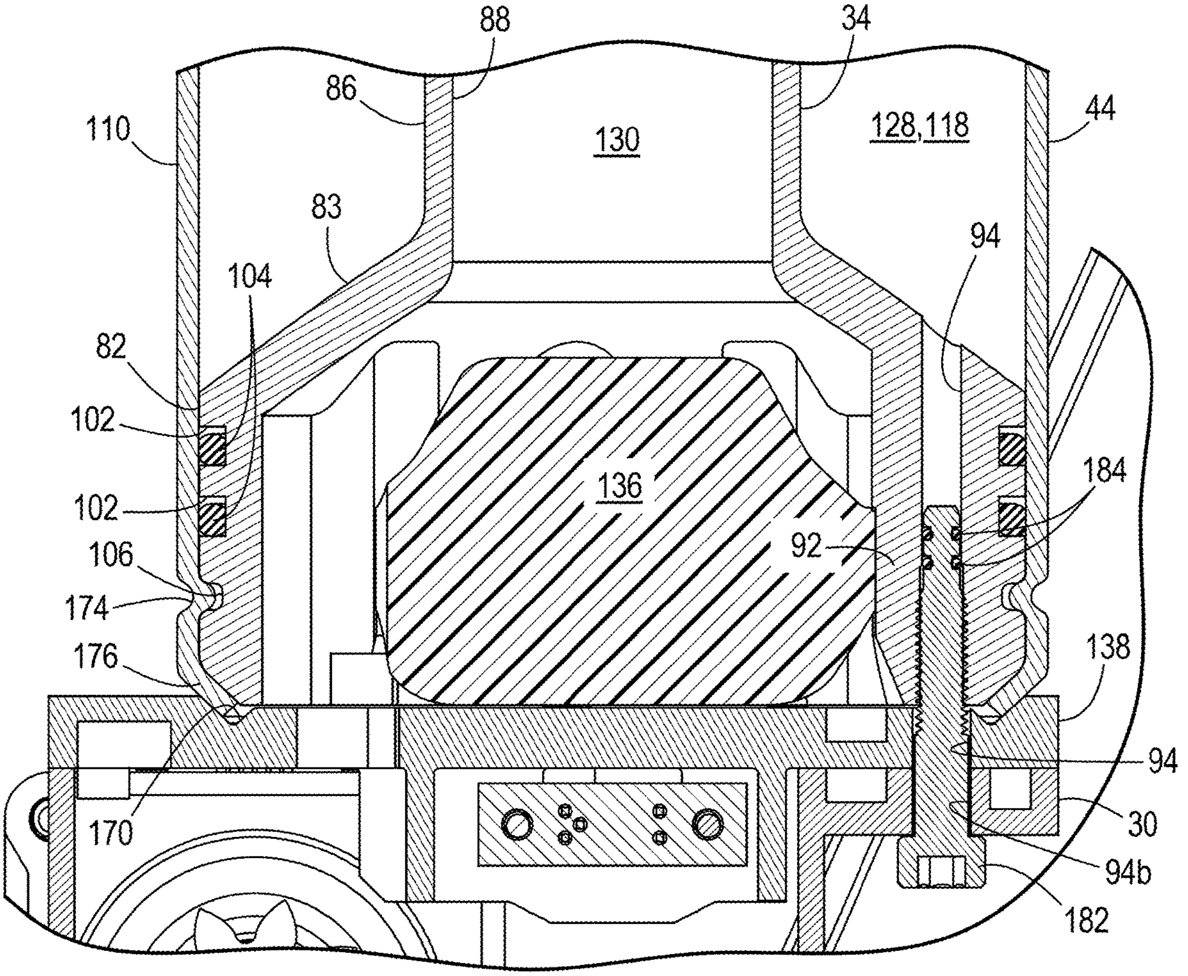
FIG. 8 is an enlarged cross-section view of a portion of the gas spring-powered fastener driver of FIG. 1B showing a mounting fastener.

With reference to FIG. 8, the inner cylinder 34 is coupled to the outer cylinder 44 by a deformed portion of the third annular wall 110 of the outer cylinder 44 to engage a portion of the inner cylinder 34. In particular, the third annular wall 110 of the outer cylinder 44 includes a circumferential projection 174 extending radially inward about the third annular wall 110 that engages with the coupling groove 106 to couple the inner and outer cylinders 34, 44 together. Additionally or alternatively, the end of the third annular wall 110 of the outer cylinder 44 includes a radially inwardly turned flange 176 that overlaps a tapered bottom end of the inner cylinder 34 to retain the inner cylinder 34 within the outer cylinder 44. The flange 176 is generally bent an angle of approximately 45 degrees, but may be bent at any other angle (e.g., approximately 60 degrees, approximately 90 degrees, etc.). Engagement between the spacing member 134 and the rear wall 114, and the first annular wall 82 and the flange 176 secures the inner cylinder 34 in place. The circumferential projection 174 and the flange 176 are each formed by a deformation process, in which the third annular wall 110 is deformed into engagement with one or more portions of the inner cylinder 34. More specifically, the circumferential projection 174 and the flange 176 may be formed by a rolling process. An annular flange groove 170 defined in the cylinder end cover 138 receives the flange 176 to sandwich the flange 176 between the end cover 138 and the inner cylinder 34 and secure the flange 176 over the lower end 85 of the inner cylinder 34.

With reference to FIGS. 3-4, the mounting plate 30 of the internal frame structure 26 is similar to the end cover 138 of the gas cylinder assembly 22. The mounting plate 30 and the internal frame structure 26 define a central channel **160*b* for passage of the driver blade 38. The mounting plate 30 further defines a plurality of arcuate slots 162*b* corresponding to the arcuate slots 162 of the end cover 138 so as to fluidly communicate the low-pressure side 130 of the gas cylinder assembly 22 with atmosphere. In some embodiments, the internal frame structure 26 may be at least partially enclosed within the housing 66. The nosepiece 14 may fluidly communicate with atmosphere. Additionally or alternatively, the housing 66 may further define vents to provide fluid communication with atmosphere. The mounting plate 30 further defines four mounting fastener apertures 164*b* corresponding with the mounting fastener apertures 164 in the end cover 138. The mounting fastener apertures 164, 164*b* are aligned with the mounting fastener bores 94 of the inner cylinder 34 so as to receive corresponding mounting fasteners 182 (FIG. 3) to couple the gas cylinder assembly 22 with the internal frame structure 26, and thereby, the fastener driver 10. The gas cylinder assembly 22, including the inner cylinder 34, the outer cylinder 44, the bumper 136, the piston 36, the driver blade 38, and the end cover 138, is removable as a unit that can be, for example, serviced or replaced by a user. Although in the illustrated embodiment, the gas cylinder assembly 22 includes the end cover 138, in other embodiments, the gas cylinder assembly 22 may instead be directly coupled to the mounting plate 30, such that the mounting plate 30 retains the bumper 136 within the cavity 84**.

Since the gas cylinder assembly 22 is removably coupled to the housing via the mounting fasteners 182, a user may easily service of the gas cylinder assembly 22 in the field. For example, the gas cylinder assembly 22 may be replaced with a replacement gas cylinder assembly if a component of the gas cylinder assembly 22 has failed or been damaged. After disconnecting the gas cylinder assembly 22, one may also replace individual components (e.g., the bumper 136, the driver blade 38, and the piston 36) by removing the end cover 138 to provide access to the cavity 84 and the piston bore 88.

As best shown in FIG. 8, the mounting fastener bores 94 extend axially through the corresponding bosses 92. Each of the mounting fasteners 182 includes two fastener gaskets 184 to inhibit leakage of gas from the gas storage chamber 118 through the mounting fastener bores 94. Each of the mounting fastener bores 94 fluidly communicates the gas storage chamber 118 (i.e., the high-pressure side 128) with the cavity 84 (i.e., the low-pressure side 130), when one of the mounting fasteners 182 is removed from the corresponding mounting fastener bore 94. In other words, when at least one of the mounting fasteners 182 is removed, the pressure within the gas cylinder assembly 22 is released through the mating threads of the mounting fastener bore 94 and the mounting fastener 182. This allows the pressure to be slowly leaked out as the mounting fasteners 182 are unthreaded from the mounting fastener bores 94 to safely depressurize the gas cylinder assembly 22 before disassembling the gas cylinder assembly 22.

Figure 9:
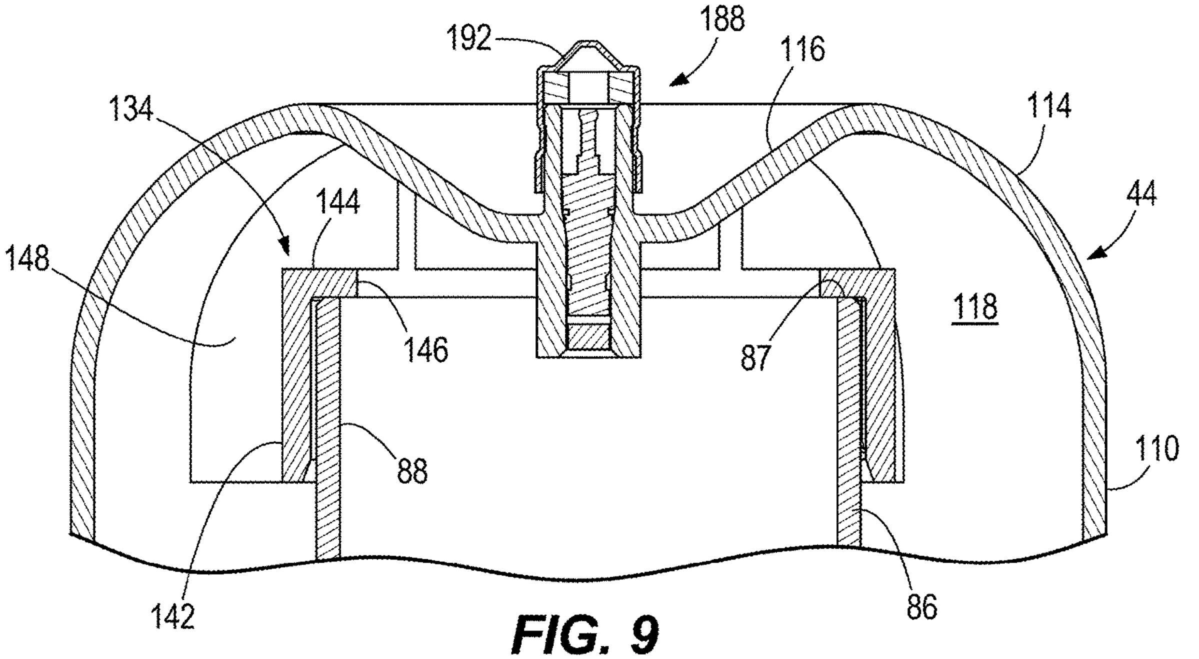
FIG. 9 is an enlarged cross-section view of a portion of the gas cylinder of FIG. 3 showing a fill valve of the gas cylinder assembly.
Figure 13:
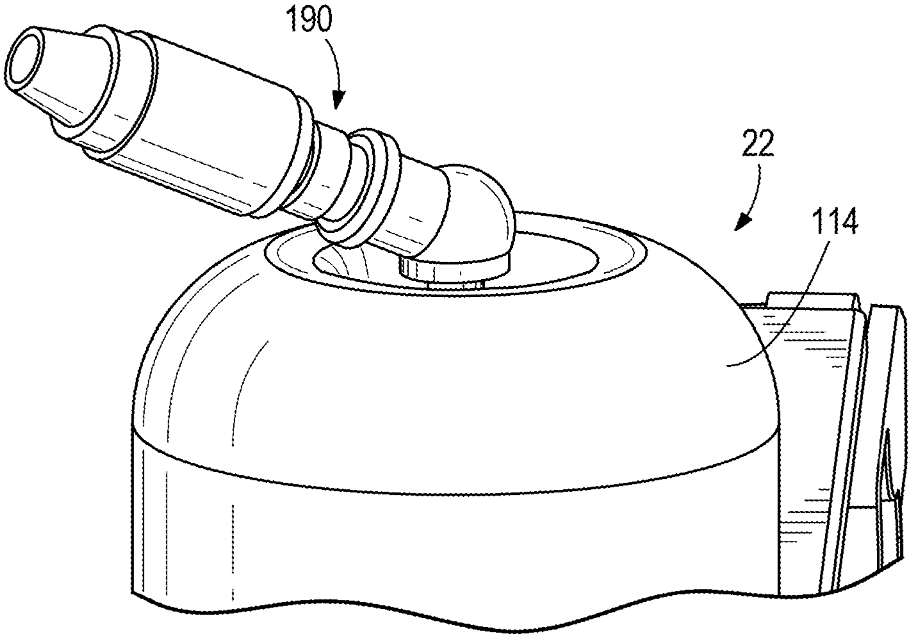
FIG. 13 is an enlarged perspective view of the rear portion of the gas cylinder assembly of FIG. 3, illustrating the gas chuck coupled to the fill valve.
Figure 14:
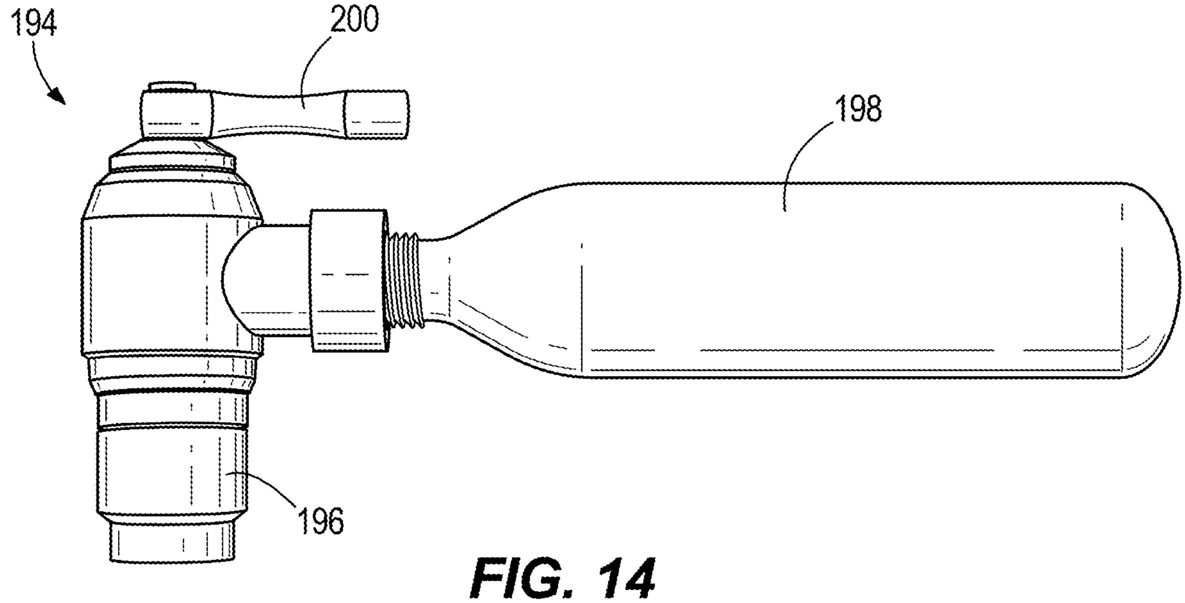
FIG. 14 is a side view of a portable single-use pressurizer.

With reference to FIGS. 4-5 and 9, the gas cylinder assembly 22 further includes a fill valve 188 coupled to the rear wall 114 of the outer cylinder 44 within the recessed portion 116 of the rear wall 114 and along the central axis of the outer cylinder 44. The fill valve 188 is configured to be selectively connected with a source of compressed gas via a gas chuck 190 (shown in FIGS. 13-14), fluidly connected with a source of compressed gas, such as an air compressor (e.g., a standard air compressor). When connected with the source of compressed gas via the gas chuck 190, the fill valve 188 permits the gas storage chamber 118 of the gas cylinder assembly 22 to be refilled or recharged with compressed gas if any prior leakage has occurred. The gas storage chamber 118 may be filled such that the high-pressure side 128 is at a desired pressure between approximately 90 psi and approximately 150 psi (e.g., approximately 120 psi). In some embodiments, the pressure may be less than 100 psi and greater than 150 psi. In some embodiments, the fill valve 188 may be configured as a Schrader valve. In other embodiments, the fill valve 188 is configured as a Presta valve, Dunlop valve, or other similar pneumatic fill valve. The fill valve 188 also allows a user to measure and check the pressure within the high-pressure side 128 with any standard pressure gauge device.

Additionally or alternatively, a portable single-use pressurizer 194 (see FIG. 14) may be used to pressurize the high-pressure side 128. In particular, the portable single-use pressurizer 194 includes a gas chuck 196 (similar to gas chuck 190 of FIGS. 13-14), a small tank 198, and a release lever 200. The small tank 198 contains enough compressed gas to fill the gas storage chamber 118 with compressed gas to the pressure (e.g., 120 psi) once. The gas chuck 190 couples to the fill valve 188 such that the release lever 200 may be actuated by a user to fill the high-pressure side 128 of the gas cylinder assembly 22 to the desired pressure. Once the compressed gas within the small tank 198 has been discharged, it may be disconnected from the gas chuck 196 and replaced with a new small tank containing a new charge of compressed gas. The portable single-use pressurizer 194 does not require external power.

With reference to FIG. 1A, a rear cover portion 204 of the housing 66 may be removably coupled from the remainder of the housing 66 to provide access to the fill valve 188. In some embodiments, the cover portion 204 is coupled to the housing 66 via threaded fasteners. In some embodiments, the cover portion 204 is coupled to the housing 66 via a snap-fit connection. In some embodiments, the cover portion 204 defines threads that engage with threads defined in a rear opening of the housing 66 (i.e., the cover portion 204 is a threaded cover).

Figure 10:
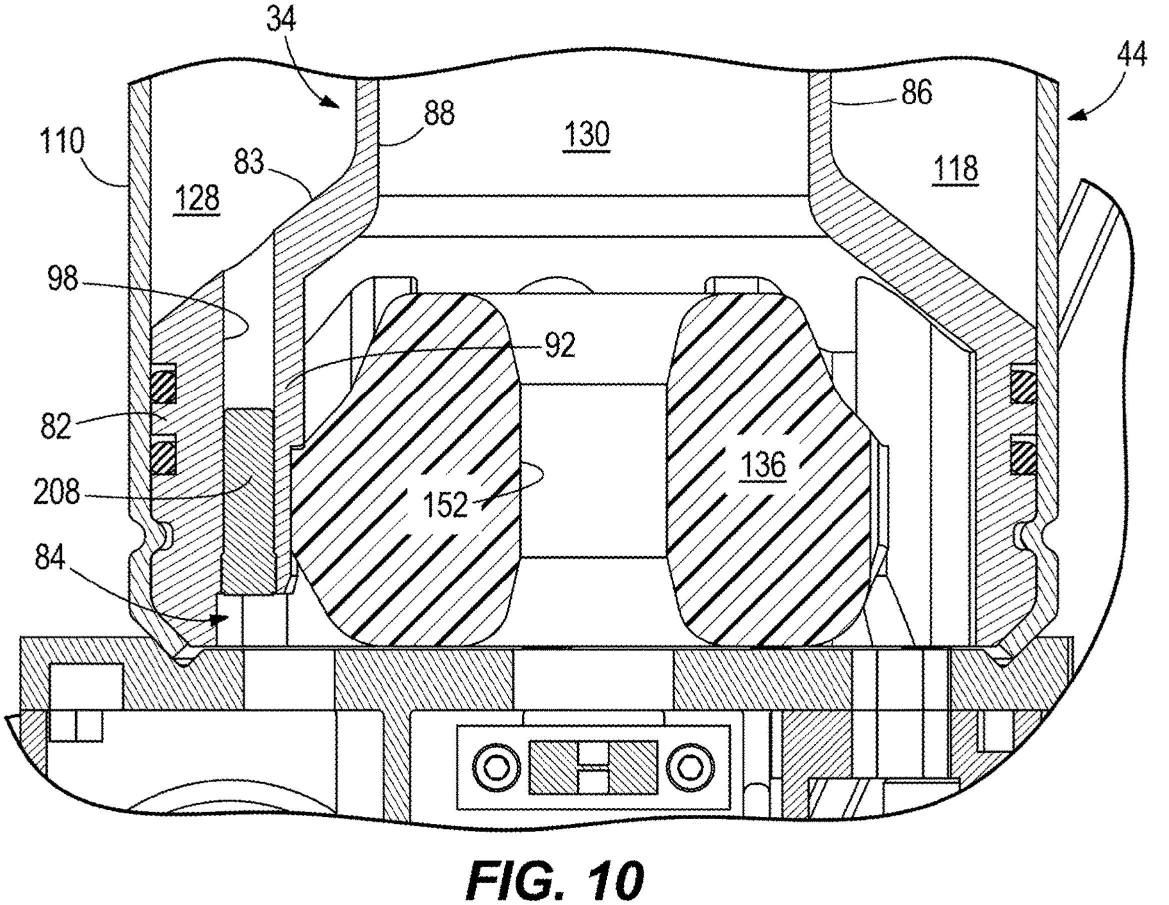
FIG. 10 is an enlarged cross-section view of a portion of the gas spring-powered fastener driver of FIG. 1B showing a pressure relief valve.
Figure 11:
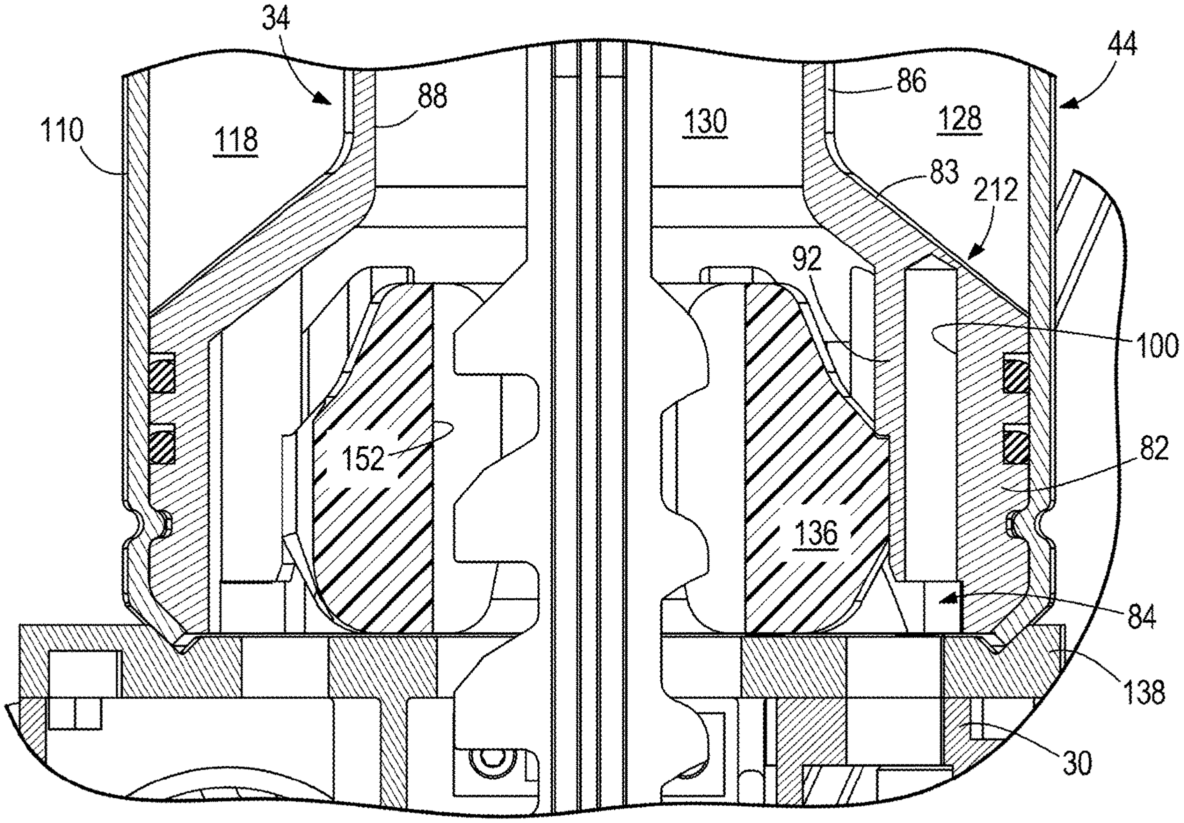
FIG. 11 is an enlarged cross-section view of a portion of the gas spring-powered fastener driver of FIG. 1B showing a safety rupture bore.

With reference to FIG. 10, the valve bore 98 extends through the corresponding boss 92 of the inner cylinder 34 from the gas storage chamber 118 (i.e., the high-pressure side 128) to the cavity 84 (i.e., the low-pressure side 130). The valve bore 98 receives and supports a pressure relief valve 208 that is threaded into the valve bore 98. The pressure relief valve 208 (i.e., a one-way pressure valve) releases gas from the gas storage chamber 118 to the cavity 84 (i.e., atmosphere) when the pressure within the gas storage chamber 118 (i.e., the high-pressure side 128) exceeds a first safety pressure (i.e., a first predetermined threshold). The first safety pressure is greater than or equal to the desired pressure of the high-pressure side 128 and may be for example between approximately 90 psi and approximately 160 psi (e.g., approximately 125 psi). In some embodiments, the first safety pressure may be less than 90 psi or greater than 160 psi. The pressure relief valve 208 prevents the gas storage chamber 118 from being over pressurized. Over pressurization can result in catastrophic failure of the gas cylinder assembly 22.

With reference to FIG. 11, the safety rupture bore 100 extends axially into the corresponding boss 92 from the cavity 84 towards the gas storage chamber 118. The safety rupture bore 100 defines a rupturable portion 212 of the inner cylinder 34 that is constructed to rupture when the pressure within the gas storage chamber 118 (i.e., the high-pressure side 128) exceeds a second safety pressure (i.e., a second predetermined threshold) that is greater than the first safety pressure. When the portion 212 ruptures, the pressurized gas from the gas storage chamber 118 is released to atmosphere, which prevents unsafe failure of the gas cylinder assembly 22. The second safety pressure may be between approximately 120 psi and approximately 180 psi (e.g., approximately 150 psi). In some embodiments, the second safety pressure may be less than 120 psi or greater than 180 psi. In the illustrated embodiment, the rupturable portion 212 is a thin wall portion of the tapered wall 83 defined adjacent a blind end of the safety rupture bore 100 so as to have a thickness that will rupture once the second safety pressure is reached. The rupturable portion 212 provides a pressure relief failsafe for the gas storage chamber 118 in case the pressure relief valve 208 fails or if the pressure in the gas storage chamber 118 increases faster than the pressure relief valve 208 is able to reduce it.

During manufacture and assembly of the gas spring-powered fastener driver 10, the gas cylinder assembly 22 is manufactured by first separately forming the inner cylinder 34 and the outer cylinder 44. For example, each of the inner cylinder 34 and the outer cylinder 44 may be formed by impact extrusion. The seal grooves 102 and the coupling groove 106 is formed in the first annular wall 82 of the inner cylinder 34 (e.g., by a machining process). The inner cylinder 34 is inserted inside the outer cylinder 44 with the spacing member 134. The open end of the inner cylinder 34 is positioned within the annular cap 142 of the spacing member 134 such that the spacing member 134 centers the inner cylinder 34 within the outer cylinder 44. The first gaskets 104 are positioned within the seal grooves 102 of the inner cylinder 34 between the inner cylinder 34 and the outer cylinder 44 to form a gas-tight seal between the first annular wall 82 of the inner cylinder 34 and the third annular wall 110 of the outer cylinder 44. The pressure relief valve 208 is inserted into the valve bore 98 of the inner cylinder 34.

The inner cylinder 34 is coupled with the outer cylinder 44 to form a pressure vessel by deforming a portion of the third annular wall 110 to engage with a portion of the inner cylinder 34. In particular, a rolling process deforms the third annular wall 110 radially inward, forming the circumferential projection 174 that extends into and engages the coupling groove 106. Another rolling process deforms the third annular wall 110 at the lower end 112 of the outer cylinder 44 radially inward to form the flange 176 that retains the inner cylinder 34 within the outer cylinder. The rolling processes may be performed independently or simultaneously on the third annular wall 110. This gas cylinder assembly 22 process has advantages over welding or fasteners, for example, by reducing weight of the gas cylinder assembly 22, and providing cost savings, among other benefits.

The driver blade 38 is coupled to the piston 36 via the threaded end 40 of the driver blade 38. The piston 36 is then inserted into the piston bore 88 of the inner cylinder 34, such that the driver blade 38 extends out of the inner cylinder 34. The second gaskets 124 are positioned between the piston 36 and the inner cylinder 34 to form a gas-tight seal between the piston 36 and the inner cylinder 34. The bumper 136 is fitted over the driver blade 38 and positioned within the cavity 84 defined by the first annular wall 82 of the inner cylinder 34. The end cover 138 is then positioned such that the driver blade 38 extends through the central aperture 160 and the mounting fastener apertures 164 and the cover fastener apertures 96 align with the mounting fastener bores 94 and the cover fastener bores 96, respectively. To couple the end cover 138 to the inner cylinder 34, the end cover fasteners 168 are inserted through the cover fastener apertures 166 and threaded into the cover fastener bores 96. As such, the bumper 136, the driver blade 38, and the piston 36 are retained within the inner cylinder 34. The gas cylinder assembly 22 as a unit can then be coupled to the internal frame structure 26 of the fastener driver 10. In particular, the gas cylinder assembly 22 is positioned such that the mounting fastener apertures 164, 164*b* of the cylinder end cover 138 and the mounting plate 30 are axially aligned. With reference to FIGS. 3 and 4, the mounting fasteners 182 can then be inserted through the mounting fastener apertures 164, **164*b* and threaded into the mounting fastener bores 94. The fastener gaskets 184 form a gas-tight seal between the mounting fasteners 182 and the inner cylinder 34 within the mounting fastener bores 94**.

Figure 12:
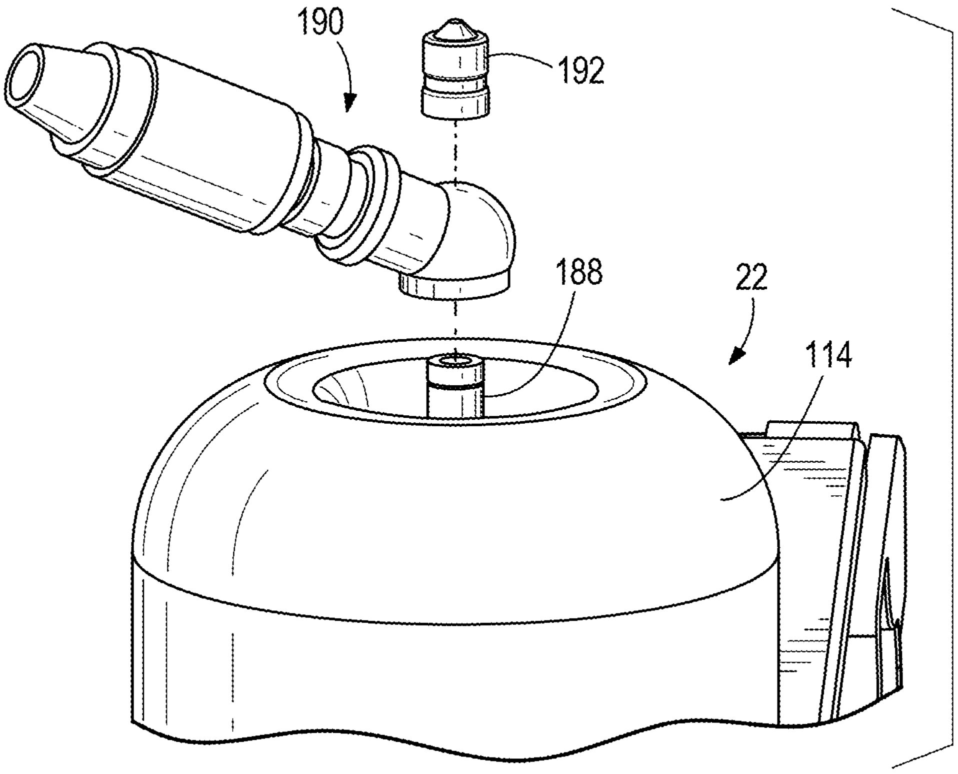
FIG. 12 is an enlarged perspective view of a gas chuck and a rear portion of the gas cylinder assembly of FIG. 3, illustrating a cap of the fill valve removed.

Once the mounting fastener bores 94 are sealed, the high-pressure side 128 of the gas cylinder assembly 22 may be filled with a gas from a source of compressed gas via the fill valve 188. In particular, the gas chuck 190, which is fluidly connected with a source of compressed gas (e.g., a gas compressor), is coupled to the fill valve 188 and pressurized to a desired pressure, after which the gas chuck 190 is decoupled from the fill valve 188. The pressure relief valve 208 releases pressure within the high-pressure side 128 of the gas cylinder assembly 22 if the pressure exceeds the first safety pressure. The thin wall portion 212 also provides a failsafe by rupturing if the pressure exceeds the second safety pressure, which may occur if the pressure relief valve 208 fails or the pressure increases too quickly. Once pressurized, the valve cap 192 is then placed over the fill valve 188 and the gas cylinder assembly 22 is enclosed by the housing 66 (FIG. 12). Specifically, the rear cover portion 204 (FIG. 1A) may be coupled to the housing 66 to cover the fill valve 188.

In operation, the lifting assembly 48 drives the piston 36 and the driver blade 38 to the ready position (FIG. 6) by energizing the motor 50. In particular, the lifter 56 is rotated counterclockwise (as viewed from FIG. 6) by the motor 50 via the transmission 51, causing the bearings 58 to engage the first teeth 52 moving the driver blade 38 and the piston 36 toward the ready position along the axis A. The spring biased latch 60 engages the second teeth 54 and prevents the piston 36 and driver blade 38 from being forced into the driven position. As the piston 36 and the driver blade 38 are driven to the ready position, the gas in the piston bore 88 above the piston 36 and the gas within the gas storage chamber 118 (i.e., the high-pressure side 128) is further compressed. Once in the ready position, the piston 36 and the driver blade 38 are held in position until being released by user activation of the trigger. When released, the compressed gas above the piston 36 and within the gas storage chamber 118 expands and drives the piston 36 and the driver blade 38 to the driven position (FIG. 7), thereby driving a fastener into a workpiece. As the piston 36 moves to the driven position air is forced out of the low-pressure 130, through the cavity 84 and the arcuate slots 162, **162*b* by the piston 36. The illustrated fastener driver 10 therefore operates on a gas spring principle utilizing the lifting assembly 48 and the piston 36 to further compress the gas within the inner cylinder 34 and the outer cylinder 44 (i.e., the high-pressure side 128 of the gas cylinder assembly 22). This process may be repeated to quickly drive multiple fasteners from the magazine into the workpiece using the same compressed gas within the high-pressure side 128 of the gas cylinder assembly 22** repeatedly.

After prolonged use of the fastener driver 10, gas contained within the high-pressure side 128 of the gas cylinder assembly 22 may leak out. As such, the gas storage chamber 118 may need to be periodically refilled or recharged by a source of compressed gas. To do this, a user removes the rear cover portion 204 of the housing 66 (FIG. 1A) to access the fill valve 188. The user may then remove the valve cap 192, couple the gas chuck 190 connected to the source of compressed gas to the fill valve 188, and fill the gas storage chamber 118 with gas to re-pressurize the high-pressure side 128 to the desired pressure. The user may alternatively use a portable single-use pressurizer 194 (FIG. 14) to quickly re-pressurize the high-pressure side 128. This provides an alternative way to pressurizer the gas cylinder assembly 22, when in the field and a gas compressor or other powered device is not readily available.

If one or more components of the gas cylinder assembly 22 fails or is damaged, a user may disconnect the gas cylinder assembly 22 from the fastener driver 10 as a unit for replacement of the entire gas cylinder assembly 22 or to replace a single component thereof. In particular, the user removes at least a portion of the housing 66 (FIG. 1A) to access the gas cylinder assembly 22 and the mounting fasteners 182. The user may then remove the mounting fasteners 182 so that the gas cylinder assembly 22 may be disconnected from the mounting plate 30 of the internal frame structure 26 and removed from the fastener driver 10 as a unit. When at least one of the mounting fasteners 182 is removed the gas within the gas storage chamber 118 leaks out of the mounting fastener bore 94 to depressurize the high-pressure side 128. A replacement gas cylinder assembly may then be coupled to the mounting plate 30, as described above in detail.

Alternatively, once the gas cylinder assembly 22 has been disconnected, the user may disconnect the end cover 138 from the inner cylinder 34 by removing the end cover fasteners 168 from the cover fastener bores 96 of the inner cylinder 34. Once the end cover 138 is disconnected, the bumper 136, the piston 36, and the driver blade 38 may be axially removed from the inner cylinder 34. The driver blade 38 may be detached from the piston 36 for further disassembly. One or more of the bumper 136, the piston 36, and the driver blade 38 may then be swapped out with a corresponding replacement component. Additionally, while the piston 36 is removed the user may replace the second gaskets 124 on the piston 36 if they have failed or become worn resulting in leakage and pressure loss. After making the desired replacements and/or repairs, the bumper 136, the piston 36, and the driver blade 38 are reassembled and repositioned within the piston bore 88 of the inner cylinder 34. The end cover 138 is then reconnected to the inner cylinder 34 to retain the gas cylinder assembly 22 as a single unit, before connecting the gas cylinder assembly 22 to the mounting plate 30, refilling the high-pressure side 128, and reattaching the rear cover portion 204, as described above.

Various features of the invention are set forth in the following claims.

What is claimed is:

1. A method of manufacturing a fastener driving device including a pressure vessel, the method comprising:
- forming an outer cylinder including an annular wall;
- positioning an inner cylinder within the outer cylinder; and
- deforming the annular wall of the outer cylinder radially inward to engage a groove defined by the inner cylinder to retain the inner cylinder within the outer cylinder and form the pressure vessel.

2. The method of claim 1, wherein the groove defined by the inner cylinder is annular, and wherein deforming the annular wall radially inward includes deforming the annular wall about a circumference of the annular wall into the annular groove.

3. The method of claim 2, wherein deforming the annular wall radially inward includes using a rolling process.

4. The method of claim 1, further comprising positioning a gasket within the groove between the inner cylinder and the outer cylinder to form a gas-tight seal between the inner cylinder and the outer cylinder.

5. The method of claim 1, wherein deforming the annular wall of the outer cylinder includes deforming an end of the annular wall radially inward to form a flange to retain the inner cylinder.

6. The method of claim 1, further comprising forming the outer cylinder using an impact extrusion process.

7. The method of claim 1, further comprising forming the inner cylinder using an impact extrusion process.

8. The method of claim 1, wherein positioning the inner cylinder within the outer cylinder includes using a spacing member to insert the inner cylinder within the outer cylinder.

9. The method of claim 8, further comprising inserting an open end of the inner cylinder within a cap of the spacing member.

10. The method of claim 9, further comprising centering the inner cylinder within the outer cylinder with the spacing member.

11. The method of claim 1, further comprising inserting a relief valve into a bore of the inner cylinder.

12. The method of claim 1, further comprising inserting a piston into the inner cylinder, wherein a driver blade coupled to the piston extends through the inner cylinder.

13. The method of claim 12, further comprising positioning an O-ring between the piston and the inner cylinder to form a gas-tight seal between the piston and the inner cylinder.

14. The method of claim 12, further comprising inserting a bumper into the inner cylinder through which the driver blade extends.

15. The method of claim 14, further comprising positioning a cover adjacent the outer and inner cylinders through which the driver blade extends.

16. The method of claim 15, wherein the cover includes a plurality of bores and a plurality of apertures.

17. The method of claim 16, wherein positioning the cover includes inserting a first plurality of fasteners into the plurality of apertures, thereby retaining the bumper, the driver blade, and the piston within the inner cylinder.

18. The method of claim 17, further comprising aligning the plurality of bores with a mounting plate.

19. The method of claim 18, further comprising inserting a second plurality of fasteners through the mounting plate, through the plurality of bores in the cover, and into a plurality of bores in the inner cylinder to clamp the outer and inner cylinders to the cover and the mounting plate, wherein at least a first fastener of the second plurality of fasteners includes a gasket to inhibit leakage of gas from a storage chamber between the outer and inner cylinders, and through the aligned bores in which the first fastener is received.

* * * * *